UNITED STATES PATENT OFFICE.

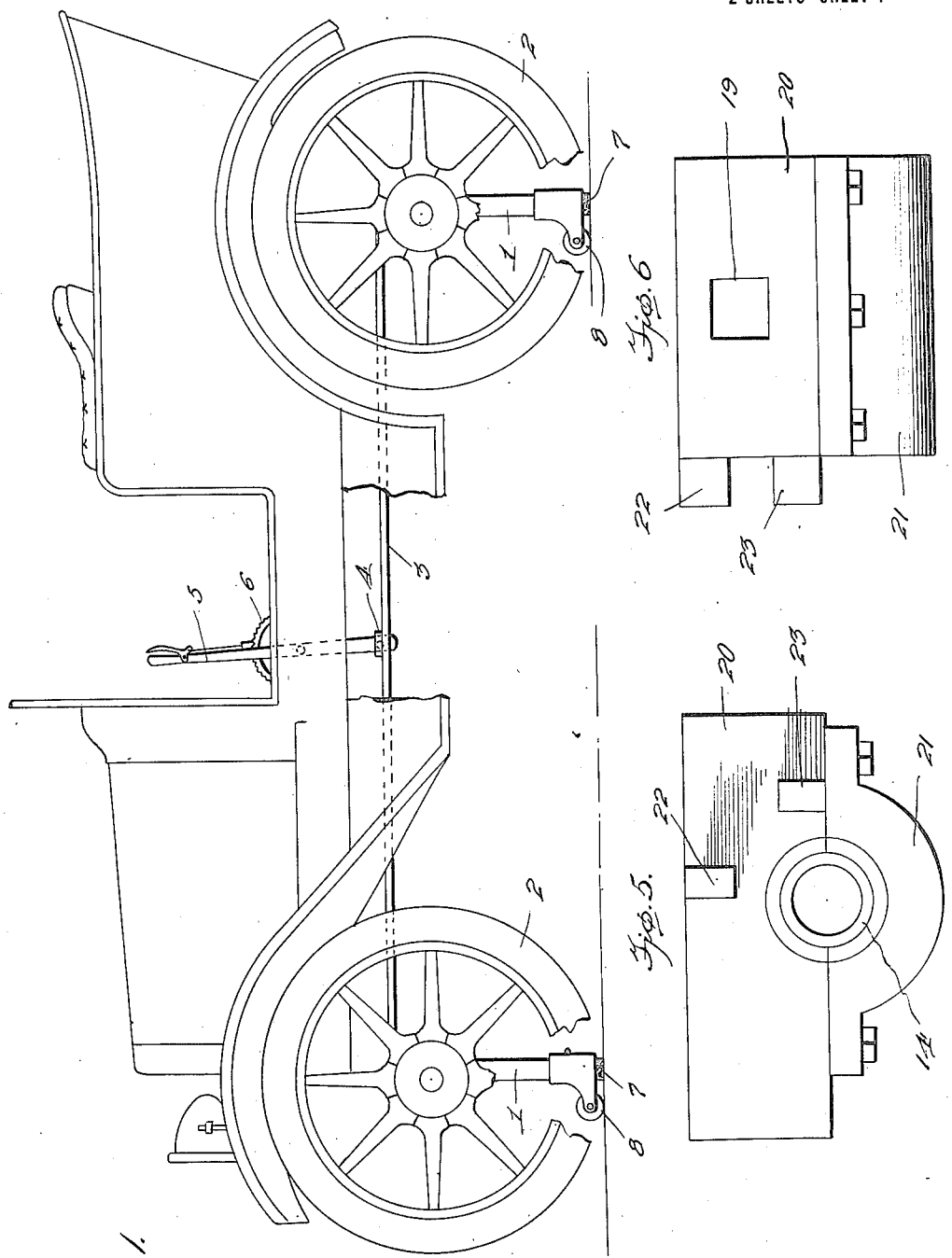

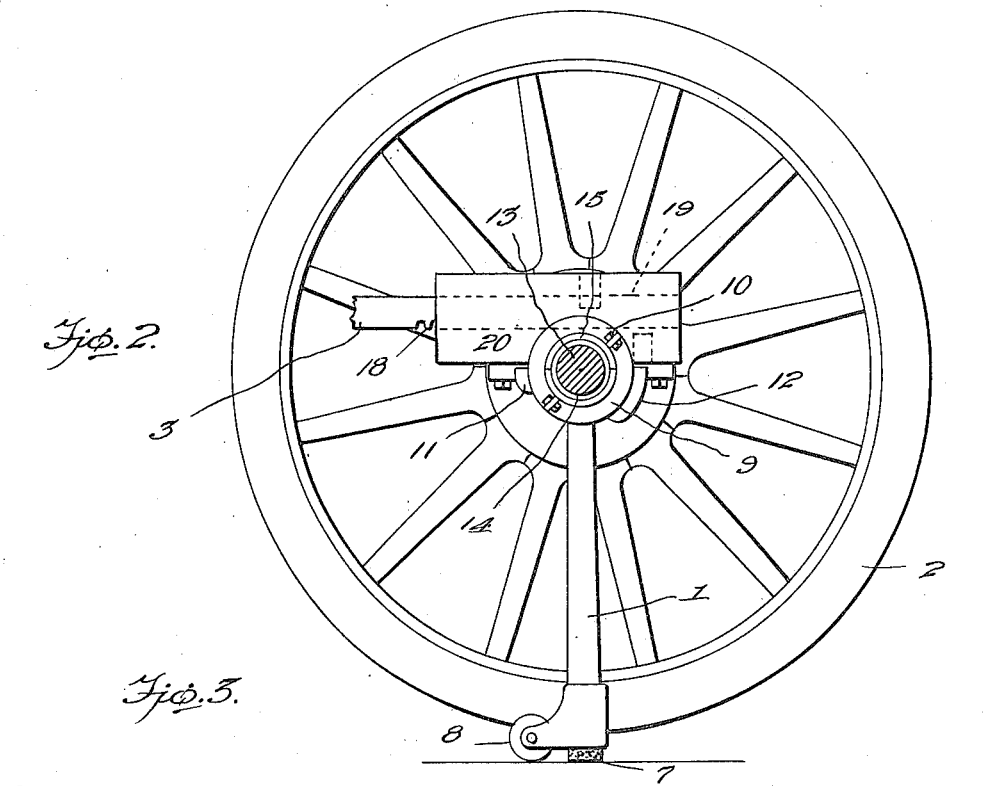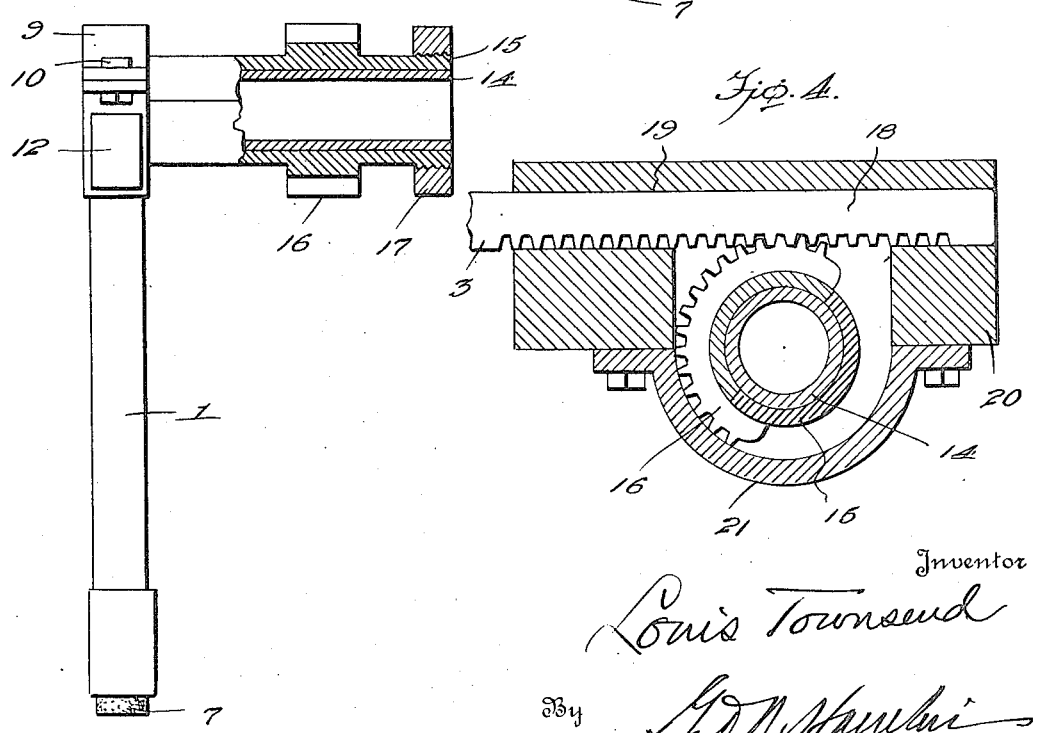

LOUIS TOWNSEND, OF EVANSVILLE, INDIANA.

AUTOMOBILE-JACK.

1,215,082.　　　　Specification of Letters Patent.　　Patented Feb. 6, 1917.

Application filed September 15, 1916. Serial No. 120,284.

*To all whom it may concern:*

Be it known that I, LOUIS TOWNSEND, a citizen of the United States, residing at Evansville, county of Vanderburg and State of Indiana, have invented certain new and useful Improvements in Automobile-Jacks, of which the following is a specification.

This invention relates to automobile jacks. The object of the invention is the provision of improved means carried by, and self-contained with, an automobile or other vehicle whereby it may be bodily raised so that its wheels will be clear of the ground. The purpose of the invention is to relieve the tires of the weight of the automobile or vehicle when at rest, thereby prolonging the life of the tires and keeping them in good condition. Obviously, the jack may be used whenever repairs of any character have to be made to the tires, or, a wheel or tire put on or taken off.

A lever, or other suitable means, located conveniently to the driver, may be used for rendering the jack active or inactive.

The invention is set forth fully hereinafter and its novel features recited in the appended claims.

In the accompanying drawings:

Figure 1 is a side elevation showing my invention applied to an automobile, parts being broken away;

Fig. 2 a detail side elevation of one of the jacks when active, the axle being in section;

Fig. 3 a detail view of a jack, partly in section;

Fig. 4 a detail view of the means for operating the jack, the axle being omitted and the box in section;

Fig. 5 a detail view of the gear box; and

Fig. 6 a view taken at right angles to Fig. 5.

The complete jack comprises four legs 1, respectively mounted to rock up and down on the axles of the vehicle inwardly of the wheels 2 thereof and simultaneously operated by rods 3, cross-connected at 4 and moved by a hand lever 5 which is locked in any position by suitable means such as a pawl and segment 6.

The mounting, construction and operation of the four legs 1 being the same, only one of them will be described.

Seated in the lower end of the leg is a rubber foot or cushion 7 and at the front of the leg, a wheel or roller 8. The cushion 7 minimizes shock when the legs first strike the ground and the wheels 8 then run along on the ground until the vehicle comes to rest, assuming the jacks are thrown down as the vehicle is slowing up, preparatory to stopping. The weight of the vehicle is borne by the rollers when the jacks are fully down.

The leg has a split hub or collar 9 at its upper end, the parts being connected by bolts 10. Lugs or stops 11 and 12 are provided on the hub 9. The axle 13 is surrounded by a thimble 14 on which is mounted the split sleeve 15 around which is clamped the collar or hub 9.

Integral with the parts of sleeve 15 are the sections of a mutilated gear 16. A collar 17 is secured on the split sleeve 15 at the end opposite the collar or hub 9.

Each rod 3 has a rack 18 which is slidable in an opening 19 in a stationary gear box 20 having a removable cap or head 21. The collars 9 and 17 bear against opposite faces of the gear box and prevent lateral displacement of the parts. On the face of the gear box 20 are lugs 22, 23 which are respectively adapted to engage lugs 11 and 12 to limit the upward and downward movements of the leg or jack 1.

On shifting lever 5 in one direction, the legs 1 will all be thrown down to strike the ground and will be prevented from further downward and backward movement by the engagement of lugs 12 and 23. On reversing the lever 5, the legs will be raised until the stops 11 and 22 engage.

Having thus described my invention, what I claim as new and desire to secure by Letters Patent, is:

1. The combination with a vehicle, of a lifting jack pivotally connected thereto provided with a supporting cushion and a roller or wheel disposed substantially parallel to the vehicle wheels, the roller being disposed in advance of the cushion.

2. The combination with a vehicle and a box carried thereby, of a lifting jack pivotally mounted therein, means for swinging the jack to render it active or inactive, and stops on the box and jack for limiting the movements of the jack when folded or let down.

3. The combination with a vehicle and a box carried thereby, having a pair of stops projecting from its end face, of a sleeve rotatable in the box, a jack mounted on the end of the sleeve and provided with stops adapted to engage the stops on the box to limit the movements of the jack when folded or let down, and means for swinging the jack to fold or lower it.

4. The combination with a vehicle and a box carried thereby, having a pair of stops projecting from its end face, of a sleeve rotatable in the box, a jack mounted on the end of the sleeve and provided with stops adapted to engage the stops on the box to limit the movements of the jack when folded or let down, teeth on the sleeve, a rack slidable in the box and meshing with the teeth, and means for shifting the rack to raise or lower the jack.

In testimony whereof, I hereunto affix my signature.

LOUIS TOWNSEND.